United States Patent
Jiang et al.

(10) Patent No.: US 8,782,033 B2
(45) Date of Patent: Jul. 15, 2014

(54) ENTITY FOLLOWING

(75) Inventors: Zhaowei Jiang, Palo Alto, CA (US); Xavier Legros, Woodside, CA (US); Ronald H. Jones, Jr., Mountain View, CA (US); Ryan Panchadsaram, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 12/957,668

(22) Filed: Dec. 1, 2010

(65) Prior Publication Data

US 2012/0143845 A1 Jun. 7, 2012

(51) Int. Cl.
  *G06F 7/02* (2006.01)
  *G06F 17/30* (2006.01)

(52) U.S. Cl.
  CPC .... *G06F 17/30864* (2013.01); *G06F 17/30598* (2013.01); *G06F 17/30991* (2013.01)
  USPC ........... 707/710; 707/722; 707/741; 707/711; 707/752

(58) Field of Classification Search
  CPC .................. G06F 17/30598; G06F 17/30864; G06F 17/30991
  USPC ......... 707/999.003, 999.1, 999.102, 999.107, 707/710, 711, 722, 741, 752; 705/319, 344; 715/230, 231
  See application file for complete search history.

(56) References Cited

U.S. PATENT DOCUMENTS

| | | | |
|---|---|---|---|
| 7,143,118 B2 | 11/2006 | Eichstaedt et al. | |
| 2002/0010760 A1* | 1/2002 | Armenta et al. | 709/219 |
| 2007/0038601 A1 | 2/2007 | Guha | |
| 2007/0143300 A1 | 6/2007 | Gulli et al. | |
| 2008/0005069 A1 | 1/2008 | Payne et al. | |
| 2008/0005073 A1 | 1/2008 | Meek et al. | |
| 2008/0243607 A1 | 10/2008 | Rohan et al. | |
| 2009/0119268 A1* | 5/2009 | Bandaru et al. | 707/3 |

(Continued)

FOREIGN PATENT DOCUMENTS

| | | |
|---|---|---|
| CN | 102521308 | 6/2012 |
| EP | 1843256 A1 | 10/2007 |
| WO | WO-2012074835 | 6/2012 |

OTHER PUBLICATIONS

An, Joohui, et al., "Automatic Acquisition of Named Entity Tagged Corpus from World Wide Web", http://acl.ldc.upenn.edu/P/P03/P03-2031.pdf, Aug. 12, 2010.
Brush, AJ Bernheim, et al., "Notification for Shared Annotation of Digital Documents", pp. 89-96, vol. No. 4, Minneapolis, MN, USA, http://citeseerx.ist.psu.edu/viewdoc/download?doi=10.1.1.133.459&rep=rep1&type=pdf, Apr. 20, 2002.

(Continued)

*Primary Examiner* — Bruce Moser
(74) *Attorney, Agent, or Firm* — Joann Dewey; Jim Ross; Micky Minhas

(57) ABSTRACT

The present invention outlines a genuine entity following system that also addresses data source limitation. When reviewing entity-related objects in web content, a web user designates one or more entities to follow in real time. More particularly, the present invention is directed through strategic deployment of a dynamic crawler upon selection of a "follow" pointer over an object in a web browser such that a web user can automatically designate entities to be followed and receive alerts at predetermined temporal intervals when new information regarding such designated entities becomes available. A web entity engine of the present invention is designed to discover trending entities at any given time while generating output activity (i.e., signal) streams for this entity.

20 Claims, 4 Drawing Sheets

(56) References Cited

U.S. PATENT DOCUMENTS

| | | | |
|---|---|---|---|
| 2009/0182725 A1 | 7/2009 | Govani et al. | |
| 2009/0240564 A1 | 9/2009 | Boerries et al. | |
| 2009/0248516 A1 | 10/2009 | Gross | |
| 2009/0282010 A1 | 11/2009 | Vasudevan et al. | |
| 2009/0309742 A1* | 12/2009 | Alexander et al. | 340/601 |
| 2010/0082611 A1 | 4/2010 | Athsani et al. | |
| 2010/0100537 A1 | 4/2010 | Druzgalski et al. | |
| 2010/0124911 A1 | 5/2010 | Leeder | |
| 2010/0131529 A1 | 5/2010 | Kasera et al. | |
| 2010/0179858 A1 | 7/2010 | Jasper et al. | |
| 2010/0280973 A1* | 11/2010 | Banker | 705/400 |
| 2012/0215761 A1* | 8/2012 | Hall et al. | 707/710 |
| 2012/0303629 A1* | 11/2012 | Klein et al. | 707/741 |

OTHER PUBLICATIONS

Bevan, Nigel, "Classifying and Selecting UX and Usability Measures", COST294-MAUSE Workshop: Meaningful Measures: Valid Useful User Experience Measurement, Jun. 2008.

"International Search Report", Mailed Date: Jun. 5, 2012, Application No. PCT/US2011/061838, Filed Date: Nov. 22, 2011, pp. 8.

Kothandaraman, Ramkumar "SOA Challenges: Entity Aggregation", Retrieved from <http://msdn.microsoft.com/en-us/library/ms954596.aspx> on Sep. 16, 2010, (May 2004), 22 pages.

Slawski, Bill "Google and Metaweb: Named Entities and Mashup Search Results?", Retrieved from <http://www.seobythesea.com/?p=4113> on Sep. 16, 2010, (Aug. 5, 2010).

* cited by examiner

ENTITY FOLLOWING

FIELD OF THE INVENTION

The present invention is directed to a system and method for a web user to directly associate one or more designated entities with an alert-based following. More particularly, the present invention is directed to following entities right where they are by providing the web user with an option that launches web crawling capabilities directed to such followed entity. By associating the following with entities at a user interface, the present invention provides the web user access to information on such followed entities as such information is updated, both directly in a browsing experience and indirectly in an alert experience.

BACKGROUND

Search engines comprise the prevailing implements for accessing information in a controlled manner. Popular search engines, such as the one provided by BING™ (BING is a trademark of Microsoft Corporation), provide an infrastructure that supports millions of inquiries on a daily basis. It is well known that search engines typically employ one or more programs (known as "crawlers" or "spiders") that automatically collect web resources, including but not limited to, web pages, images, videos, audio files, Word documents, PDFs, etc. Dynamic crawlers can often be employed to follow entities and provide updated data on such entities. Copies of all retrieved pages are created by the search engine, which will index the downloaded pages to provide fast searches. Since most web pages contain objects (such as links) to other web pages, a crawler can start almost anywhere and can repeatedly follow the links found from a central page to index new resources.

A problem with the design of conventional search engines is that the focus of the search is placed on the location of the information as a destination. Accessing information about such entities is a process that is not always intuitive. As shown in FIG. 1, distinct destinations are organized currently around topics or "entities" 10 that may appear on one or more pages 12 organized on a website 14 or in any other web-supported medium. Currently, web users must proactively seek the relevant feeds or dynamic content related to entities of interest and rely upon the search engine's ranking of the top matching web pages to retrieve the relevant data. Upon identifying entities by searching, a web user, in order to follow such entities and receive desired updates, must designate the entity as being of interest. The web user can elect to receive updated entity content by subscribing to an RSS (Really Simple Syndication) feed (or to receive delivery of updated dynamic content). The web user can take the extra step of creating alerts (via e-mail, SMS, video feed, audio signal, or the like) that are delivered on a specific temporal basis (monthly, weekly, daily, or immediately as updates occur).

Conventional entity following does not address the manner in which the vast majority of people use search engines. As Internet technologies rapidly restructure methods of content distribution, and as the web-based knowledge stream becomes increasingly digitized, it is desirable to translate the web content resources into a function that more closely replicates actual user logic and intuition. While conventional RSS and alert systems provide some similar features, they do not completely fulfill the web user's need to follow designated entities in real time. RSS limits the web user to follow a single data source about an entity rather than multiple sources (for instance, following stories on Brooklyn from the New York Times rather than extensive web content directed to information about Brooklyn). Any associated alerting system that allows web users to receive alerts on the desired entity is based on a data-sourced subscription rather than the entity itself.

It is therefore desirable to employ user experience (UX) design to overcome such limitations by making the web user experience part of the design process. Specifically, as information spaces become more niche, it is desirable to provide over-arching architecture that enables web users to surface entities in the web context, regardless of where the context resides, and contemporaneously associate an alert function with updates in entity content.

SUMMARY

The present invention outlines a genuine entity following system that also addresses data source limitation and account creation limitation. When reviewing entity-related objects in web content, a web user designates one or more entities to follow in real time. More particularly, the present invention is directed through strategic deployment of a dynamic crawler upon selection of a "follow" pointer over an object in a web browser such that a web user can automatically designate entities to be followed and selectively browse update feeds from the followed entity. In addition, the user can selectively receive alerts at predetermined temporal intervals when new information regarding such designated entities becomes available.

A web entity engine of the present invention is designed to discover trending entities at any given time while generating output activity (e.g., signal) streams for this activity. Web content, whether from feeds or dynamically generated, can be annotated with these trending entities by the disclosed entity annotation engine. Special visual effects are applied to annotated entities inside the web content when displayed to the web user (for instance, by dragging an interactive pointer such as via touch screen, mouse or equivalent device). The web user can thereby elect to follow the highlighted entity, upon which election the engine generates updated data feeds and/or notifications to be sent to the web user when new signals about the entity emerge over the Internet.

Various other advantages and features of the present invention will become readily apparent from the following detailed description.

BRIEF DESCRIPTION OF DRAWINGS

While the specification concludes with claims particularly pointing out and distinctly claiming the invention, it is believed that the embodiments will be better understood from the following description in conjunction with the accompanying figures, in which:

DETAILED DESCRIPTION

Figure 1:
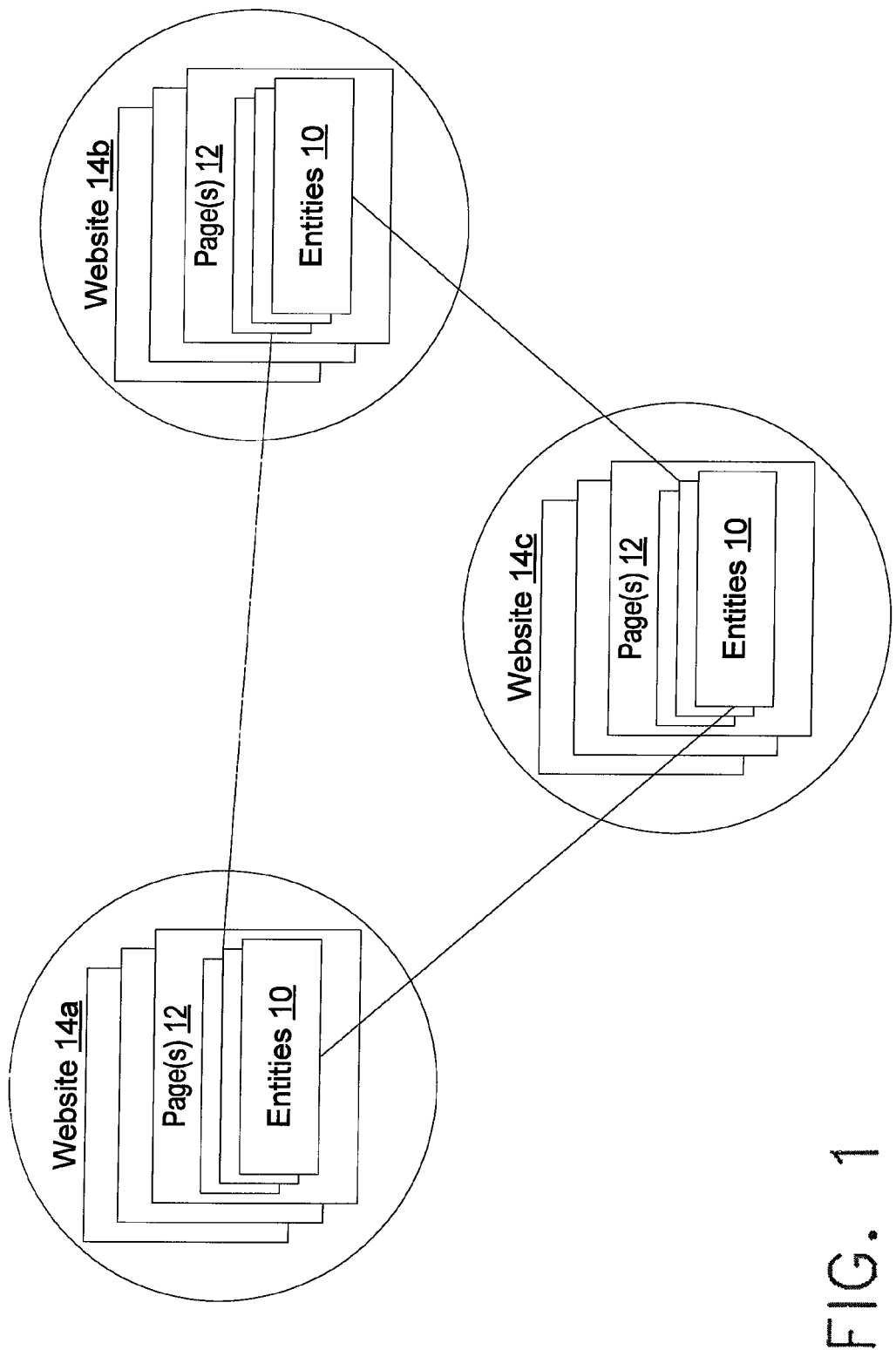
FIG. 1 is a schematic of a network of entity content embedded in at least one website page.
Figure 2:
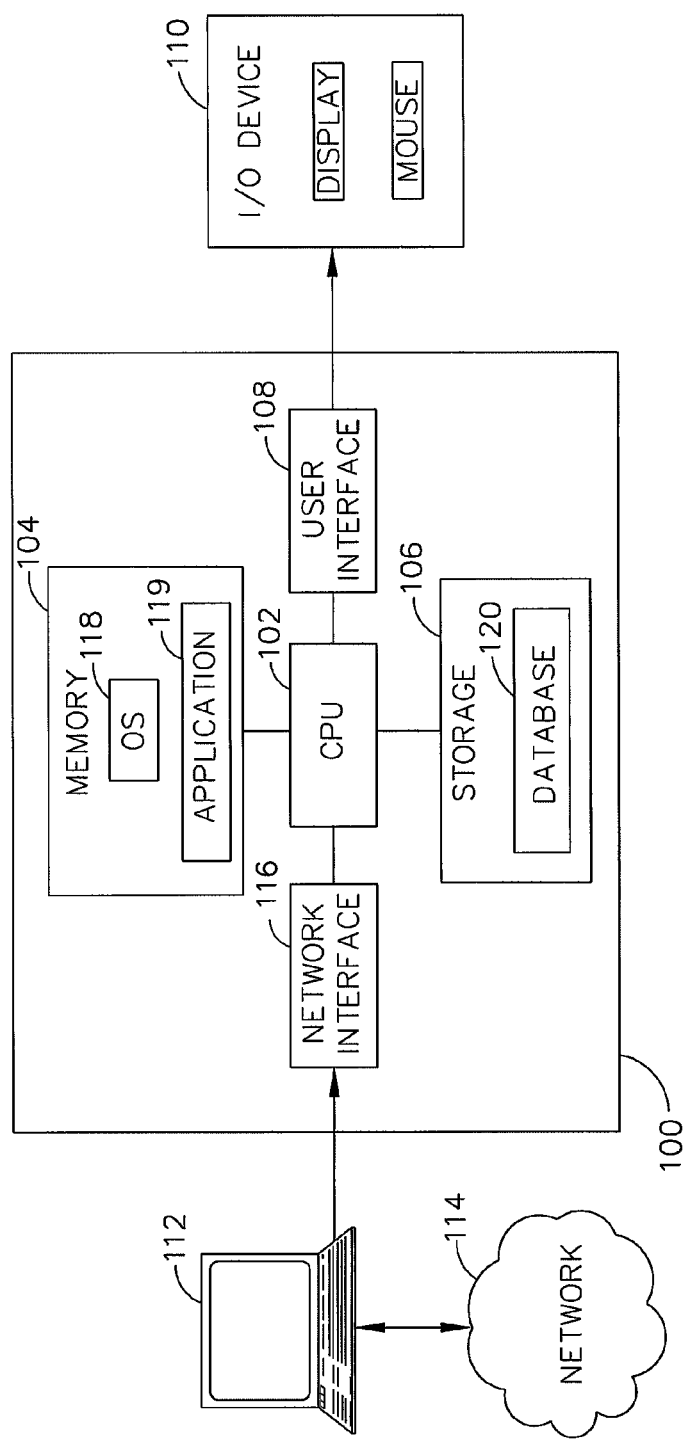
FIG. 2 is a block diagram of a networked computer device with which the present invention entity following is practiced.

Now referring to the figures, wherein like numerals identify like elements, FIG. 2 shows an exemplary hardware and software environment for a computing device 100 having components that can be used to implement one or more of the embodiments described above. For the purposes of this invention, computing device 100 can include any type of computer, computer system or other programmable electronic device, including a client computer, a server computer, a portable computer, a handheld computer, a mobile phone, a gaming device, an embedded controller and any combination and/or equivalent thereof. Moreover, computing device 100 may be implemented using one or more networked computers, e.g., in a cluster or other distributed computing system. It is understood that the exemplary environment illustrated in FIG. 2 is not intended to limit the present invention, and that other alternative hardware and/or software environments may be used without departing from the scope of the present invention. Further, the terms "computing device", "computer device", "computer" and "machine" shall be used interchangeably and shall be taken to include any collection of computing devices that individually or jointly execute a set (or multiple sets) of instructions to perform any one or more of the methods discussed herein.

Computing device 100 typically includes a central processing unit (CPU) 102 having one or more microprocessors coupled to a memory 104. Memory 104 can represent random access memory (RAM) devices comprising the main storage of computing device 100, as well as any supplemental levels of memory (including but not limited to cache memories, non-volatile or backup memories such as programmable or flash memories, read-only memories and any combination and/of equivalent thereof). In addition, memory 104 may be considered to include any cache memory in a processor in CPU 102, as well as any storage capacity used as a virtual memory (i.e., stored on a mass storage device 106 or on another computer coupled to computing device 100).

Computing device 100 further includes at least one each of an input and an output for communicating information externally. For interface with a web user or operator, computing device 100 can include a user interface 108 such as a graphical user interface (GUI) incorporating one or more I/O devices 110 (including but not limited to a display, a keyboard/keypad, a mouse and/or other pointing device, a trackball, a joystick, a haptic feedback device, a microphone, a speaker, a touch screen, a touchpad, a webcam and like devices that enable operative response to user commands that are received at a computing device). Otherwise, user input may be received via another computing device 112 coupled to computing device 100 over a network 114. This latter configuration may be desirable where computing device 100 is implemented as a server or other form of multi-user computer, although computing device 100 may also be implemented as a standalone workstation, desktop, or other single-user computer in some embodiments. In such configuration, computing device 100 desirably includes a network interface 116 in operative communication with at least one network 114. Network 114 may be a LAN, a WAN, a wireless network, and/or the Internet, although network 114 is not limited to these network selections.

Computing device 100 operates under the control of an operating system 118, and executes or otherwise relies upon various computer software applications 119. For example, a database management system (DBMS) may be resident in memory 104 to access a database 120 resident in mass storage 106. Database 120 may be stored in a separate structure, such as a database server, connected, either directly or through a communication link, with the remainder of computing device 100. Moreover, various applications may also execute on one or more processors in another computer coupled to computing device 100 via a network in a distributed or client-server computing environment.

In general, the routines executed to implement the embodiments of the invention, whether implemented as part of an operating system or a specific application, component, program, object, module or sequence of instructions, can be referred to herein as "computer program code," or simply "program code" Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention is disclosed in the context of fully functioning computers and computer systems, those skilled in the art will appreciate that the various embodiments of the invention are capable of being distributed as a program product in a variety of forms. The present invention can be successfully practiced on a variety of computer readable media, examples of which include, but are not limited to, tangible recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

Figure 3:
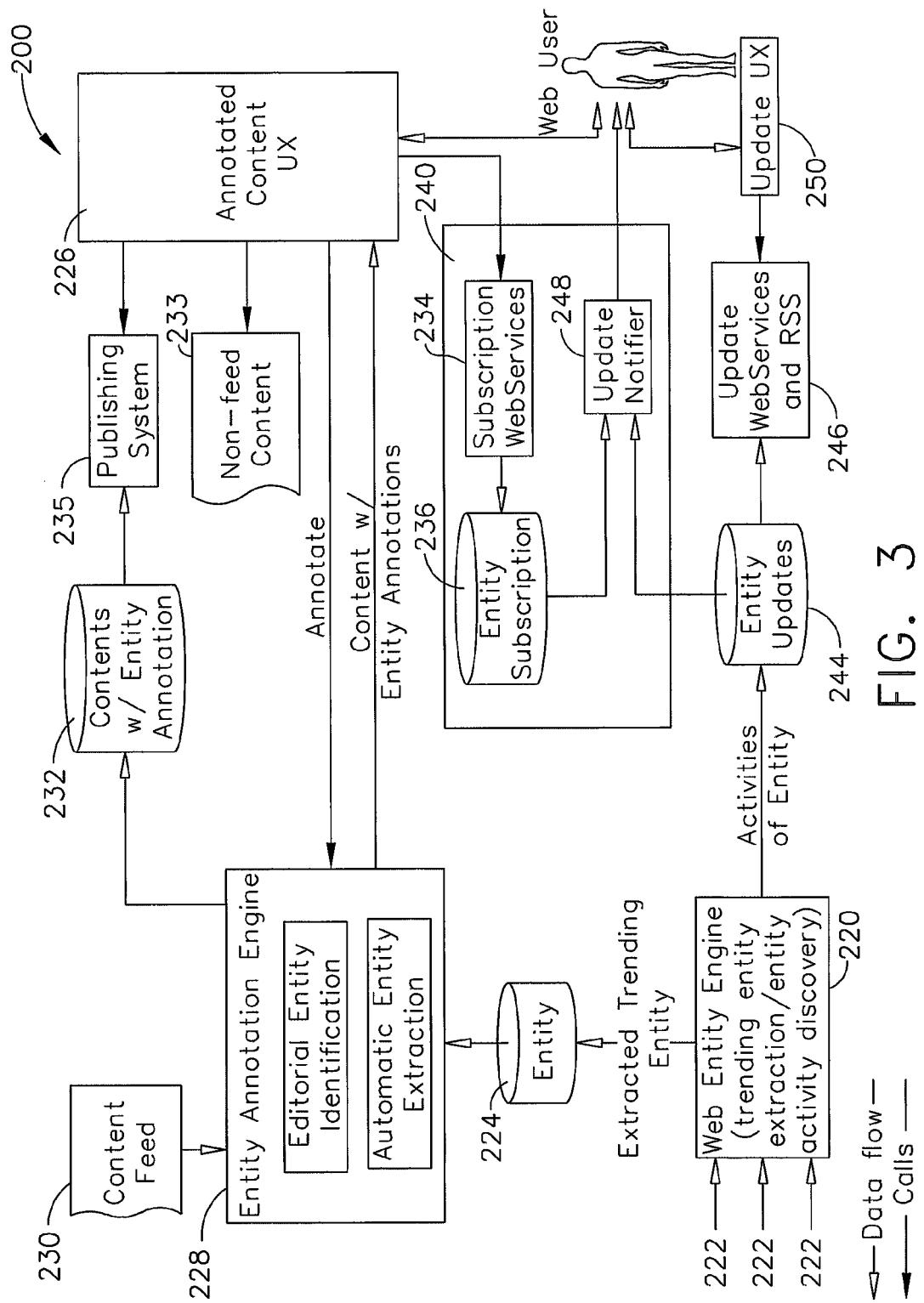
FIG. 3 is an exemplary entity following architecture in accordance with the present invention.

Now referring to FIG. 3, the relationships and data flows among functional elements in a preferred embodiment of the present invention are shown. System 200 as depicted has a client-server architecture that allows web users to designate selected entities in web content and associate such entities with a following for a desired temporal period. Such users can contemporaneously associate one or more of an updated data feed and an alert generation with such followed entities, the latter of which automatically generates alerts as web content associated with such entities is updated. System 200 functions as a website that displays Internet content within which entities are highlighted selectively by a web user for following (as further described hereinbelow). As used herein, the terms "web users" and "users" are used interchangeably to refer to any operator that interacts with the disclosed entity following system via a search engine. System 200 includes a web entity engine 220 that continuously receives entity content extracted via dynamic crawler across a network (e.g., the Internet). Web entity engine 220 is a continuously running software program that runs on one or more computers and connects to one or more data feeds 222 from numerous sources, including but not limited to text, graphics, video, audio, hypertext, uniform resource locator (URL) data, RSS/Atom feeds and combinations, equivalents and complements thereof. The content is searched and retrieved by crawlers that can run continuously or at predetermined time intervals (i.e., every minute, every 5 minutes, every 30 minutes, etc.).

Web entity engine 220 collects data from the data feeds 222 and stores the resultant entity set in a searchable index provided in entity database 224. Signals (representing activities and/or updates) about the discovered entities are aggregated as a feed (designated as "Extracted Trending Entity") that is fed into entity database 224 together with temporal trending parameters (for example, time stamps embedded in web pages showing the latest content updates) and stored in a storage medium integral therewith. As used herein, the terms "trending" and "trending entity" refer to the evolution of an entity over time (e.g., trend) that can reveal changes in entity relevance, popularity of links to certain entities and traffic volume of landing pages in which web content about such entities is integrated. Although the present invention is described herein with respect to trending entities, it is understood that the present invention is amenable for entity extraction with respect to static entities (i.e., those that may remain unchanged for prolonged periods). Entity content can be extracted from a static list of predetermined entities (e.g., the local coffee shop) and dynamically changing entities that include specific names and classes (e.g., person, place, location, thing, organization, celebrity, athlete, team, book or song title, topic, etc.). It should be noted that various methodologies for detecting fresh trends can be used that, although outside the scope of this invention, are amenable for practice therewith.

Content that has been assigned a class is used to train a classifier to predict a class for entity content that does not have an associated class. In this manner, entity content that is not assigned a class can have a class predicted therefor. This is a particularly useful UX benefit, in that classes can be pre-defined or user defined, and class categories can be static or can evolve dynamically. The new terms are added when new trends are discovered, and the old terms are discarded when the older trends lose importance. Bayesian classifiers, support vector machine (SVM) classifiers and equivalents and complements thereof can be used as evolving classifiers, as is known in the art.

An entity annotation engine 228 is provided that processes all incoming content feed 230 to detect the existence of a current trending entity in the content. If such trending entity content is present in the content feed, the top n entities will be annotated, where n represents the entities designated by the web user for following. The selection of n is a UX decision (input at annotated content UX 226) that directly impacts on the relevance of the delivered content over time (whereby any ranking of entities relies on the entity's trending parameters and the relevance with the content). The contents with entity annotation (including automatic entity extraction from entity database 224 and editorial identification derived from annotated content UX 226) are stored in annotated content 232. For dynamic content, or non-feed content 233 that is not fit for a feed, this annotation can be performed in a just-in-time manner Entity annotation can also be accomplished manually by editors using a publishing system 235, as is known in the art.

Figure 4:
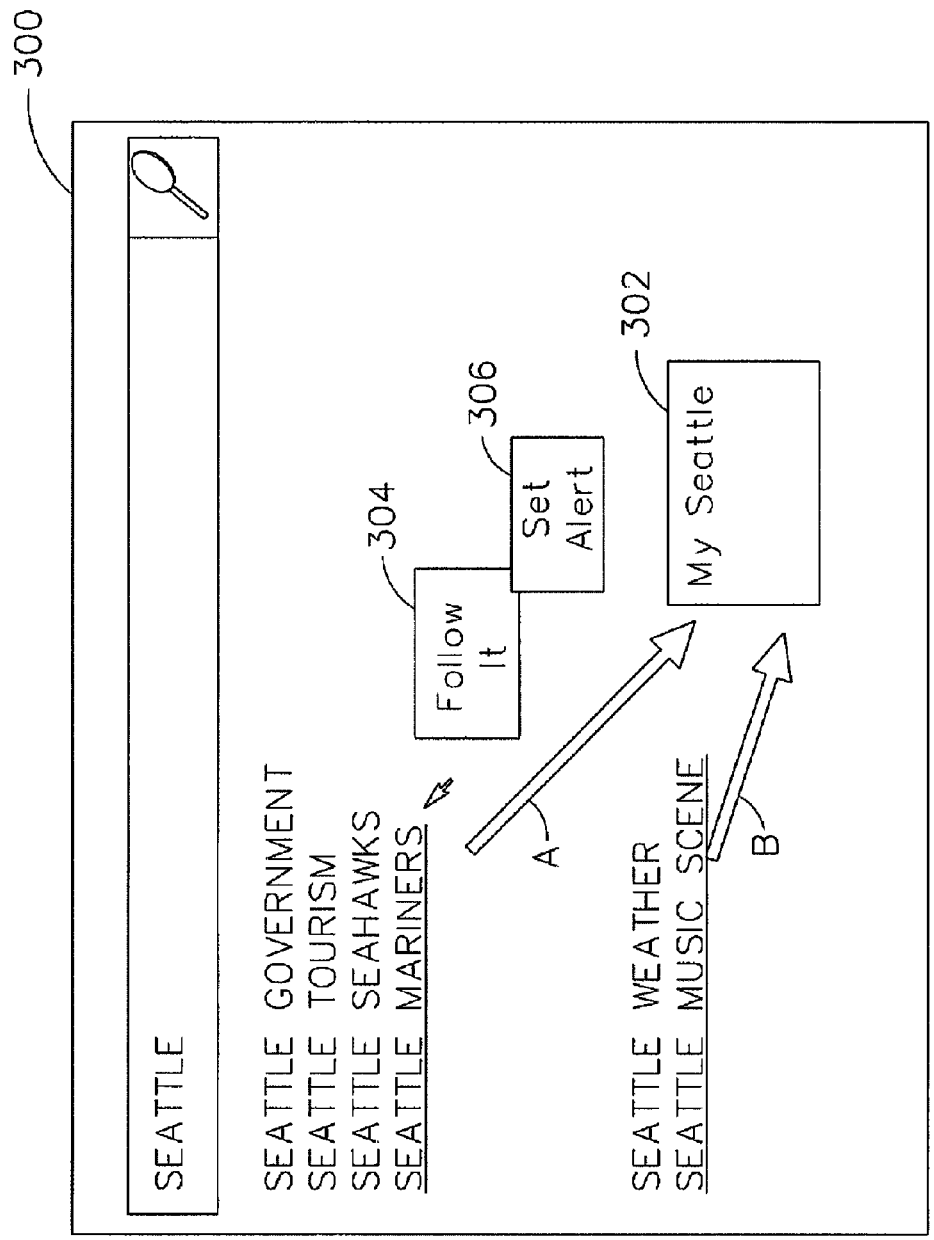
FIG. 4 is a screen shot of a web user interface via which a web user designates entities for following in accordance with the present invention.

A web user can access system 200 via annotated content UX 226 that enables interaction between the web user and a computing device via a user interface such as a search engine window 300 provided on a user interface display (as shown in FIG. 4 and further described hereinbelow). Source content, or content that a web user is currently accessing on a user interface, is analyzed to automatically locate content about one or more entities, which entities need not be specifically identified by the web user at the onset of a web search query. Annotated entities are displayed with special visual effect with hover options at annotated content UX 226 via a user interface such as search engine window 300 (as may be provided on a display screen or equivalent device, or the contents of which may be communicated orally, via haptic means or other means for providing access to a search engine and results derived thereby). At the interface, the web user can drag and drop annotated text that is generated by entity annotation engine 232 for any related purposes, for instance, to create a catalogue of followed entities having related themes, or to create a timeline of entity updates pursuant to the web user's strategic intelligence gathering. As an example, with reference to FIG. 4, a web user retrieving search results for the search term "SEATTLE" may view multiple search return results in multiple, unrelated classes, including Seattle sports teams, Seattle weather, Seattle nightlife and multiple other topics concerning the city of Seattle. A web user clicking on the entity "SEATTLE MARINERS" can elect to place such entity in a catalogue 302 (entitled "MY SEATTLE") along with the entity "SEATTLE MUSIC SCENE" as designated by arrows A and B. In this manner, the web user can regularly update and amend catalogue 302 to reflect the web user's current interest selections and track followed entities on a real time basis.

Referring further to FIGS. 3 and 4, a web user reading the annotated content in search engine window 300 can designate an entity to be followed by electing a "Follow It" option 304 in the hover manual to follow the interested trending topics. The designation of entities to be followed is interpreted by a subscription web services engine 234 as the equivalent of a subscription that is stored in an entity subscription database 236. An update notifier 248 that obtains subscription data from entity subscription database 236 and updates from entity update database 244 coordinates the entity subscriptions with the updates on the corresponding followed entities to deliver a requested alert to the web user (as further described hereinbelow). A unified UX 240 maintains a list of entities a web user is following, or has followed, and provides editorial functionalities that permit amendment of the list of entities followed. Updates and activities for followed entities are also available through unified UX 240, individually or in an aggregated form, and are themselves subject to amendment. For example, unified UX 240 can include an interest class filter selection in which interest classes are listed along with a checkbox for each class listed. The web user selects the check box for each interest class for which the web user would like entity content of current interest to be included in the web user's followed entities. Using principles of UX design, existing entities can have multiple forms (including but not limited to catalogue, search, trending topics, etc.) and still be amenable to following.

Once the web user associates a following with one or more designated entities, the web user can contemporaneously associate an alert with updates to such followed entities such that the web user receives notifications for new updates (such as by election of a "Set Alert" option 306 as shown in FIG. 4). Upon detection of new updates by web entity engine 220, the updated content for followed entities (shown as "Activities of Entity") is stored on entity update database 244. When a web user elects to receive automatic alerts on the followed entities, update notifier 248 corresponds the subscription requests of followed entities with updated entity content from entity update database 244. Update notifier 248, upon receiving entity updates in coordination with followed entities, generates an alert indicating that the data source is of current interest on the basis of followed entities that is delivered to the web user via unified UX 240. Alternatively, the web user, at Update UX 250, can manually access updated feed of content regarding the followed entities via a web services and RSS feed 246.

In the alert, the web user may receive an indication of updated entity content in, for example, a list of URLs that provide the location of dynamic content (such as web content on the World Wide Web) that may be of interest to the web user at the time of the alert. When such content is indeed updated, an alert is delivered to the web user to advise of such update on the followed entity. The alert can be accepted or rejected by the web user, and may display the number of occurrences, dates of occurrences and hyperlinks to other entities for content published within a certain period of time that can be user-selectable. The architecture for providing the alert message based on content that may be received as an event-based or time-based feed does not form part of the present invention, and any known architecture that is amenable to the practice of the present invention is envisioned (for example, the alert delivery architecture disclosed by U.S. Pat. No. 7,143,118 assigned to Yahoo, the full disclosure of which is incorporated by reference herein). In some cases, a web user could select alerts for certain registered interests to be provided by all available methods and other alerts for other registered interests to be provided by only one method. Additionally, some alerts may be provided with relatively immediate notification, in which case the invention would employ stored contact information to deliver the alert to the web user with all selected delivery methods. In contrast, other alerts can be provided that provide alerts in response to proactive requests from a web user regarding other registered interests. The requests can also be scheduled at predefined times to provide digests at periodic intervals for ready access by the user. Similarly, a desired time for delivery can be specified in the web user profile. A message limit can also be provided in the web user profile to limit the number of alerts and/or other messages that are sent to the web user. The queries can be distributed among computing devices based on the type of content, the current load on the computing devices, and/or other properties. The alert can be delivered in any designated format, including, but not limited to, instant messaging (IM), e-mail, Short Message Service (SMS), Multimedia Message Service (MMS), voice messages, and the like.

In practice, a web user launches a search engine request, and a landing page on a website has a search box that serves as ingress to a search engine (and thereby provides access to content that is relevant to the web user). The landing pages can display text, images, dynamic compilations of relevant links and/or combinations of these and other elements, along with embedded JavaScript that automatically forwards a search query that is entered into the search box to the server along with metadata that identifies the search engine. As web entity engine 220 extracts entity content from data feeds 222, entity updates are stored in entity update database 244 and transmitted via update web services and RSS feed 246. Entity update database 244 is queried to determine if a record exists for the followed entity. It is determined whether the query performed identifies an existing database entry for the followed entity as indicated in the alert (i.e., whether a prior alert indicated the same followed entity). If it is determined that a database entry does exist for the followed entity, a record is created in the unified UX 240 with respect to the followed entity of the alert. Concurrently, entity annotation engine 228 processes all incoming content feed to detect the existence of a current trending entity in the content, which content feed is stored in annotated content database 232. An inquiry initiated at UX 226 can access the contents with entity annotation for review and selection by the web user for designation of entities to be followed and association of the designated followed entities with one or more alerts.

Once the web user has associated a following with the designated entity, the dynamic crawler uses the new trends found from entity annotation engine 228 to more rapidly associate the updated entity content with the followed entities. For example, news sources may disseminate rapid reports covering an unanticipated event that is subject to rapidly changing conditions (e.g., a weather emergency, earthquake, economic event, terrorist activity, etc.). The web user designates this event as an entity to be followed by hovering over the entity and clicking "Follow It" (as shown in exemplary form in FIG. 4). The dynamic crawler can then focus on those collected web objects that are related to the designated entity. Whether or not general interest in the topic diminishes, the dynamic crawler maintains an internal index in order to reflect the web user preference to follow the entity (for instance, to keep apprised of the aftermath of a severe weather event). The web user can similarly disassociate the following from such entity.

Anticipated events may also be designated as entities to be followed (e.g., elections, concerts, sports events, etc.) and also used for focused crawling. A web user enters a search query using a search engine that searches the extracted entities for annotated content at unified UX 240. The search engine in connection with the dynamic crawler stores search queries and analyzes entities in search terms. The search terms are associated with entity content by entity annotation engine 228 to predict possible related search terms. The predicted search terms are offered to a web user as optional search terms in a graphical user interface (GUI) display. The web user can be presented with various options for display of the content associated with the followed entity. For example, a graphics or video entity display can includes a title for the entity that is also a hyperlink, summary of entity, duration of complete content, source, class, date and time, and user selectable video and/or graphics. The search engine can return personalized web pages where content sharing the same topics are followed together, thereby enabling the web user to monitor the evolution of the entity following over time. Entities are therefore designated to be followed on the basis of having synergistic dynamic relations. Algorithms for such correlations are known within the art and do not form part of the present invention.

System 200 can suggest additional entities to be followed on the basis of web user history regarding certain entities (for example, a web user performing a daily query on local weather can prompt the system to suggest "hometown weather" as an entity to be followed). The relevance of data provided for a specific search query can also be tuned via an entity-specific tuned searching system, such as that disclosed by co-owned U.S. Pat. No. 7,739,270, the entire disclosure of which is incorporated by reference herein.

The present invention beneficially exploits web users' ability to add content over time. As web pages begin to age and exhibit characteristic resources for topical information about an entity, the present invention entity following is less reliant upon the pages' relevance, link popularity and traffic, than it is on the entity itself. The present invention advantageously allows web users to immediately identify natural language text much like they would in a newspaper, book or other print medium. The result is an entity following system that enables a scalable index of specifically targeted content delivered on schedule as indicated by the web user. The present invention utilizes the web's function as a content network to provide web users with pages of content, much like a library provides its users with volumes of hard copy references indexed by class and topic. Although the web user may not be hunting for something specific, the web user may find an object in content that correlates to the web user's specific interests and needs. The present invention therefore thrives in the evolution of the Internet as an entity web having networks of people, places, things and subjects that are connected to one another.

Various changes to the foregoing described and shown structures are now evident to those skilled in the art. The matter set forth in the foregoing description and accompanying drawings is therefore offered by way of illustration only and not as a limitation. Accordingly, the particularly disclosed scope of the invention is set forth in the following claims.

What is claimed is:

1. A system comprising:
a processor; and
a computer storage medium coupled to the processor, wherein the computer storage medium has a set of instructions stored thereon that, when executed on the processor, implement a method comprising:
receiving, from more than one data source, content to be stored in a searchable index;
annotating the content with a topic selected from a plurality of topics;
aggregating the annotated content as a feed pertaining to an entity based on the topic with which the content is annotated, the annotating performed only if the entity is ranked among a top number of entities, the top number set by a user;
receiving a search engine request entered by the user, the search engine request relating to the entity;
causing the annotated content to be displayed via a user interface in response to the received search engine request, wherein a visual effect indicates that the entity is available for designation;
associating a following with the entity responsive to receiving a user designation of the entity; and
causing the feed pertaining to the entity to be displayed via the user interface.

2. The system of claim 1, wherein annotating the content with the topic comprises annotating the content with one or more search terms included in the search engine request.

3. The system of claim 1, wherein associating a following comprises associating a following with a predetermined number of entities.

4. The system of claim 1, wherein the method further comprises initiating a drag-and-drop operation to designate the entity.

5. The system of claim 1, wherein updates to the annotated content are displayed at the user interface.

6. The system of claim 1, wherein the method further comprises providing a subscription web services engine configured to store the following associated with the entity in an entity subscription database, the entity subscription database being in communication with the subscription web services engine.

7. The system of claim 1, wherein the method further comprises associating an alert with the entity, wherein the alert indicates that updates to the annotated content correlate to the entity.

8. The system of claim 7, wherein the method further comprises causing the user interface to display a visual effect regarding the alert.

9. The system of claim 8, wherein the method further comprises providing an update notifier that coordinates the following associated with the entity with the updates to the annotated content to deliver the alert.

10. The system of claim 7, wherein the method further comprises determining if a record exists for the updates to the annotated content.

11. The system of claim 10, wherein the method further comprises, responsive to determining that no record exists for the updates, generating an alert for indicating, at the user interface, that a data source includes updates to the annotated content.

12. The system of claim 7, wherein the alert is in the format of at least one of instant messaging (IM), e-mail, Short Message Service (SMS), Multimedia Message Service (MMS), voice messaging, or any combination thereof.

13. The system of claim 1, wherein associating a following comprises associating the entity with a class selected by the user, wherein the entity relates to the class.

14. The system of claim 13, wherein the method further comprises providing a trained classifier to predict the class for annotated content that does not have an associated class.

15. A method comprising:
receiving content from more than one data source;
annotating the content with a topic selected from a plurality of topics;
aggregating the annotated content as a feed pertaining to an entity based on the topic with which the content is annotated, the annotating performed only if the entity is ranked among a top number of entities, the top number set by a user;
receiving a search engine request entered by the user, the search engine request relating to the entity; and
causing the annotated content to be displayed via a user interface in response to the received search engine request; wherein a visual effect indicates that the entity is available for designation.

16. The method of claim 15, further comprising:
associating a following with the entity responsive to receiving a user designation of the entity; and
causing the feed pertaining to the entity to be displayed via the user interface.

17. The method of claim 15, wherein annotating the content with the topic comprises associating the content with one or more search terms included in the search engine request.

18. One or more computer-readable memory comprising instructions stored thereon that, when executed, to cause a device to perform a process comprising:
receiving content from more than one data source, the content pertaining to a plurality of topics;
annotating the content with a topic selected from the plurality of topics;
aggregating the annotated content as a feed pertaining to an entity based on the topic with which the content is annotated, the annotating performed only if the entity is ranked among a top number of entities, the top number set by a user;
receiving a search engine request entered by the user, the search engine request relating to the entity;
causing the annotated content to be displayed via a user interface in response to the received search engine request, wherein a visual effect indicates that the entity is available for designation; and
associating a following with the entity responsive to receiving a user designation of the entity.

19. The one or more computer-readable memory of claim 18, the process further comprising:
detecting one or more updates to the annotated content; and
providing updates to the annotated content to the user interface.

20. The one or more computer-readable memory of claim 18, the process further comprising associating an alert with the entity, wherein the alert indicates that updates to the annotated content correlate to the entity.

* * * * *